United States Patent
Wang et al.

(10) Patent No.: US 9,143,185 B2
(45) Date of Patent: Sep. 22, 2015

(54) TRANSMIT-RECEIVE SWITCHING CIRCUIT AND WIRELESS DEVICE

(71) Applicant: KABUSHIKI KAISHA TOSHIBA, Tokyo (JP)

(72) Inventors: Tong Wang, Kawasaki (JP); Toshiya Mitomo, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 28 days.

(21) Appl. No.: 14/013,669

(22) Filed: Aug. 29, 2013

(65) Prior Publication Data

US 2014/0065984 A1    Mar. 6, 2014

(30) Foreign Application Priority Data

Aug. 31, 2012    (JP) .................. 2012-191986

(51) Int. Cl.
  *H04B 1/44*    (2006.01)
  *H04B 1/48*    (2006.01)
  *H04B 1/525*   (2015.01)

(52) U.S. Cl.
  CPC .. *H04B 1/48* (2013.01); *H04B 1/44* (2013.01); *H04B 1/525* (2013.01)

(58) Field of Classification Search
  CPC ............. H04B 1/44; H04B 1/48; H04B 1/525
  USPC ............. 455/78, 83, 90.2, 230, 296
  See application file for complete search history.

(56) References Cited

U.S. PATENT DOCUMENTS

| | | | |
|---|---|---|---|
| 4,637,073 A | | 1/1987 | Selin et al. |
| 6,341,216 B1 | | 1/2002 | Itoh |
| 6,509,799 B1 * | | 1/2003 | Franca-Neto ............. 330/305 |
| 7,092,677 B1 * | | 8/2006 | Zhang et al. ............. 455/78 |
| 7,245,187 B2 * | | 7/2007 | Khajehpour ............. 330/305 |
| 7,417,515 B2 * | | 8/2008 | Chominski ............. 333/105 |
| 7,489,910 B2 * | | 2/2009 | Kato et al. ............. 455/101 |
| 2002/0177417 A1 * | | 11/2002 | Visser ............. 455/83 |
| 2004/0124944 A1 * | | 7/2004 | Nation ............. 333/104 |
| 2007/0232241 A1 * | | 10/2007 | Carley et al. ............. 455/83 |
| 2009/0289861 A1 * | | 11/2009 | Tang et al. ............. 343/722 |
| 2011/0234333 A1 * | | 9/2011 | Tsukahara ............. 333/104 |

FOREIGN PATENT DOCUMENTS

| | | |
|---|---|---|
| JP | 61-13823 | 1/1986 |
| JP | 2008-072475 | 3/2008 |

OTHER PUBLICATIONS

Notification of Reason for Rejection issued by the Japanese Patent Office on Sep. 2, 2014, for Japanese Patent Application No. 2012-191986, and English-language translation thereof.

* cited by examiner

*Primary Examiner* — Duc M Nguyen

(74) *Attorney, Agent, or Firm* — Finnegan, Henderson, Farabow, Garrett & Dunner, L.L.P.

(57) ABSTRACT

A transmit-receive switching circuit provided between a transmitter circuit configured to generate a transmission signal to be transmitted from an antenna and a receiver circuit configured to receive a reception signal received by the antenna, a transistor input control circuit configured to make the transmitter generate a transmission signal by an amplifying operation of a transistor in an output stage of the transmitter circuit when the transmission signal is transmitted from the antenna, and to short-circuit an output terminal of the transmitter circuit to a ground voltage when the reception signal is received by the antenna.

14 Claims, 3 Drawing Sheets

TRANSMIT-RECEIVE SWITCHING CIRCUIT AND WIRELESS DEVICE

CROSS REFERENCE TO RELATED APPLICATIONS

This application is based upon and claims the benefit of priority from the prior Japanese Patent Application No. 2012-191986, filed on Aug. 31, 2012, the entire contents of which are incorporated herein by reference.

FIELD

Embodiments of the present invention relate to a transmit-receive switching circuit capable of switching between transmission and reception through an antenna, and to a wireless device.

BACKGROUND

A wireless device has a transmit-receive switching circuit for switching between a transmission signal transmitted from an antenna and a reception signal received by the antenna. The transmit-receive switching circuit is required to be isolated from a receiver circuit in the case of transmission, and to be isolated from a transmitter circuit in the case of reception. Thus, the transmit-receive switching circuit generally includes a ¼-wavelength transfer line. When one end of this transfer line is short-circuited, impedance on the one end side becomes infinite when seen from the other end side, which makes it possible to be isolated relatively easily.

However, the impedance becomes infinite only in an ideal state. Actually, increase in on-resistance or increase in signal loss in the case of transmission is caused due to parasitic capacitance or parasitic resistance.

Since there is a trade-off relationship between parasitic capacitance and parasitic resistance, reduction in parasitic capacitance leads to increase in on-resistance, and increase in parasitic capacitance leads to increase in signal loss in the case of transmission.

DETAILED DESCRIPTION

Figure 1:
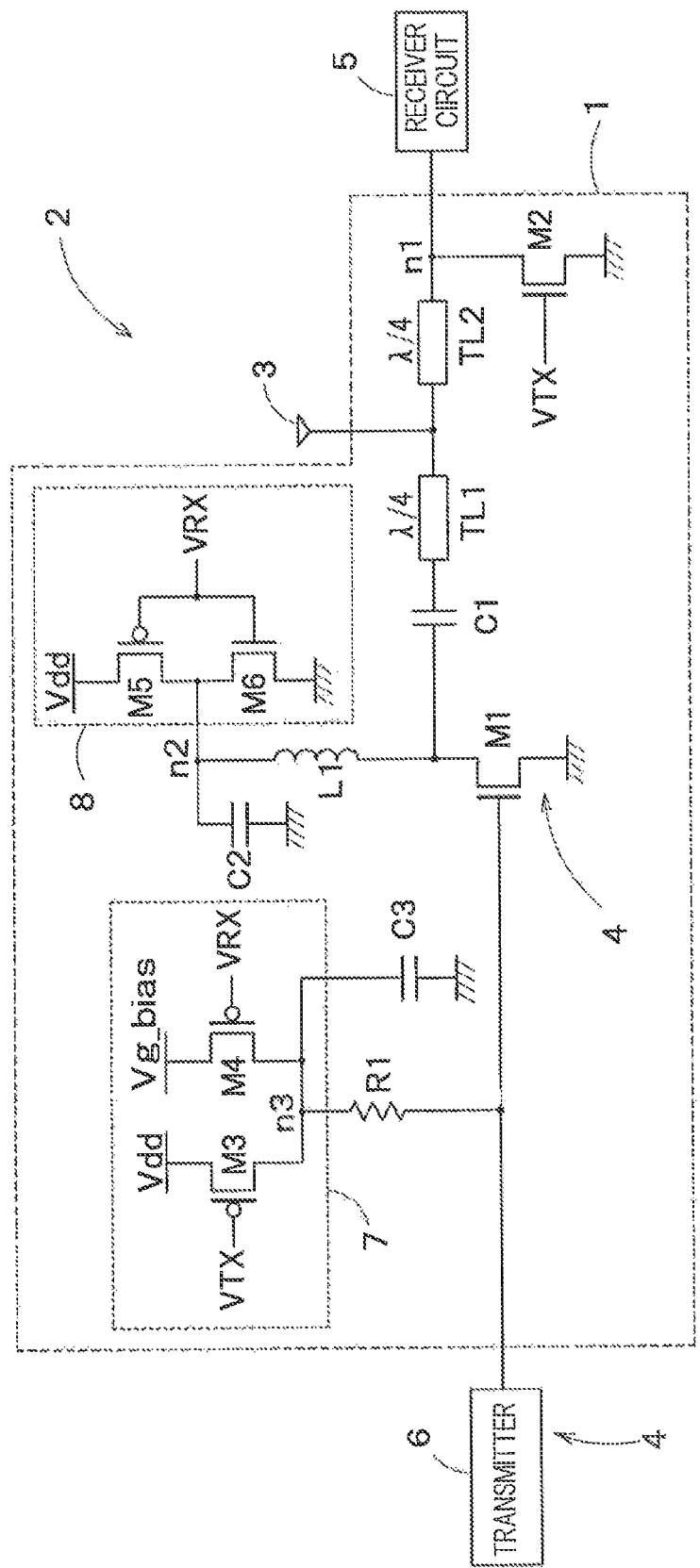
FIG. 1 is a circuit diagram of a wireless device 2 having a transmit-receive switching circuit 1 according to a first embodiment.

According to one embodiment, a transmit-receive switching circuit is provided between a transmitter circuit configured to generate a transmission signal to be transmitted from an antenna and a receiver circuit configured to receive a reception signal received by the antenna. A transistor input control circuit makes the transmitter generate a transmission signal by an amplifying operation of a transistor in an output stage of the transmitter circuit when the transmission signal is transmitted from the antenna, and short-circuits an output terminal of the transmitter circuit to a ground voltage when the reception signal is received by the antenna.

Hereinafter, embodiments of the present invention will be explained referring to the drawings.

(First Embodiment)

FIG. 1 is a circuit diagram of a wireless device 2 having a transmit-receive switching circuit 1 according to a first embodiment. The wireless device 2 of FIG. 1 has an antenna 3, the transmit-receive switching circuit 1, a transmitter circuit 4, and a receiver circuit 5.

The transmitter circuit 4 has a transmitter 6 and a transistor M1 connected in the output stage of the transmitter 6. This transistor M1 is utilized also as a part of the transmit-receive switching circuit 1.

The transmit-receive switching circuit 1 has a transistor input control circuit 7 for controlling the gate voltage of the transistor M1, a transistor output control circuit 8 for controlling the drain voltage of the transistor M1, a ¼-wavelength transfer line TL1 for transmission, a ¼-wavelength transfer line TL2 for reception, a receiving-side short-circuiting circuit M2 for switching whether or not to ground one end n1 of the transfer line TL2, a capacitor C1 for blocking direct-current voltage on the transfer lines TL1 and TL2, an inductor L1 connected between an output node n2 of the transistor output control circuit 8 and the drain of the transistor M1, a capacitor C2 connected between the output node n2 of the transistor output control circuit 8 and a ground terminal, a resistance R1 connected between an output node n3 of the transistor input control circuit 7 and the gate of the transistor M1, and a capacitor C3 connected between the output node n3 of the transistor input control circuit 7 and a ground terminal.

The ¼-wavelength transfer lines TL1 and TL2 have line lengths of ¼λ, where λ represents a wavelength of a transfer signal.

in FIG. 1, the capacitor C1 is connected between the drain of the transistor M1 and the transfer line TL1, but the capacitor C1 can be connected at an arbitrary location between the drain of the transistor M1 and an input terminal of the receiver circuit 5.

The receiving-side short-circuiting circuit M2 is an NMOS transistor having a drain connected to one end n1 of the transfer line TL2, a source which is grounded, and a gate into which a VTX signal, which is set to High in the case of transmission, is inputted. Accordingly, in the case of transmission, the receiving-side short-circuiting circuit M2 is turned on to short-circuit one end n1 of the transfer line TL2 to the ground voltage. Therefore, in the case of transmission, the impedance between the antenna 3 and the receiver circuit 5 becomes infinite.

The transistor input control circuit 7 has a pair of PMOS transistors M3 and M4 having drains connected in common. The resistance R1 is connected between the drains of the transistors M3 and M4 and the gate of the transistor M1. Further, the capacitor C3 is connected between the drains of the transistors M3 and M4 and the ground terminal.

One PMOS transistor M3 has a gate into which the VTX signal is inputted, and a source which is applied with power-supply voltage Vdd. The other PMOS transistor M4 has a gate into which a VRX signal is inputted, and a source which is applied with bias voltage Vg_bias.

In the case of transmission, the VTX signal becomes High and the VRX signal becomes Low, and thus the PMOS transistor M4 is turned on and a predetermined bias voltage Vg_bias is supplied to the gate of the transistor M1. Further, in the case of reception, the PMOS transistor M3 is turned on and a predetermined reference voltage Vdd is supplied to the gate of the transistor M1.

The transistor output control circuit 8 has an inverter formed of a PMOS transistor M5 and an NMOS transistor M6. The VRX signal is inputted into the gates of the transistors M5 and M6. The source of the PMOS transistor M5 is applied with the power-supply voltage Vdd, and the source of the NMOS transistor M6 is grounded.

The capacitor C2 is connected between the ground terminal and a connection node n2 of the drain of the PMOS transistor M5 and the source of the NMOS transistor M6. The inductor L1 is connected between this connection node and the drain of the transistor M1. This inductor L1 is provided for impedance matching.

The capacitor C2 is provided to bring the alternating-current impedance of the output node n2 of the transistor output control circuit 8 to zero, while the capacitor C3 is provided to bring the alternating-current impedance of the output node n3 of the transistor input control circuit 7 to zero.

Next, operation of the transmit-receive switching circuit 1 of FIG. 1 will be explained. In the case of transmission, the VTX signal for controlling switching between transmission and reception is set to the power-supply voltage, and the VRX signal is set to the ground voltage. Accordingly, the transistor M3 in the transistor input control circuit 7 is turned off, the transistor M4 is turned on, and the gate voltage of the transistor M1 is set to the bias voltage Vg_bias. Further, the transistor M5 in the transistor output control circuit 8 is turned on, the transistor M6 is turned off, and the drain of the transistor M1 is set to the power-supply voltage Vdd.

In this state, the transistor M1 operates as an amplifier circuit in the output stage of the transmitter circuit 4.

That is, a high-frequency signal outputted from the transmitter 6 is superimposed on the bias voltage Vg_bias and inputted into the gate of the transistor M1, and the transistor M1 performs power amplification on the high-frequency signal and outputs it from the drain. This high-frequency signal passes through the capacitor C1 and the transfer line TL1, to be emitted from the antenna 3.

Further, in the case of transmission, the transistor M2 is turned on, and a connection node n1 of the transfer line TL2 and the receiver circuit 5 is short-circuited to the ground voltage. Accordingly, the impedance on the side of the receiver circuit 5 is low when seen from this connection node n1, but high when seen from the antenna 3.

On the other hand, in the case of reception, the VTX signal is set to the ground voltage, and the VRX signal is set to the power-supply voltage. Accordingly, the transistor M3 is turned on while the transistor M4 is turned off, by which the gate voltage of the transistor M1 is set to the power-supply voltage Vdd. Further, the transistor M5 is turned off while the transistor M6 is turned on, by which the drain of the transistor M1 is set to 0V.

As stated above, in the case of reception, gate-source voltage and gate-drain voltage of the transistor M1 are both set to the power-supply voltage, and thus the transistor M1 operates as a switch in ON state. Accordingly, the impedance on the side of the transmitter circuit 4 is low when seen from the drain of the transistor M1, but high when seen from the antenna 3. Since the drain-source voltage of the transistor M1 is set to 0V, consumption current of the transistor M1 is 0.

Further, in the case of reception, the transistor M2 is turned off, and the high-frequency signal received by the antenna 3 is transferred to the receiver circuit 5 through the transfer line TL2.

Generally, in a transmit-receive switching circuit having a ¼-wavelength transfer line and a transistor connected between this transfer line and a ground terminal, isolation characteristics of the transmit-receive switching circuit are improved as the on-resistance of the transistor becomes smaller. However, when the transistor is designed to have a larger size in order to reduce the on-resistance, parasitic capacitance of the transistor when being turned off is increased, which deteriorates passing characteristics of the transmit-receive switching circuit.

Conventionally, the size of the transistor is designed considering the balance between the on-resistance of the transistor and the parasitic capacitance of the transistor when being turned off.

On the other hand, in the present embodiment, the transistor M1, which is a part of the transmitter circuit 4, is designed considering only the characteristics of the amplifier circuit in the output stage of the transmitter circuit 4. Normally, the transistor M1 is designed to have a large size in order to increase transmission power. Accordingly, the on-resistance of the transistor M1 which is turned on in the case of reception can be sufficiently reduced, which makes it possible to achieve a good isolation.

Further, since the transistor M1 is a part of the transmitter circuit 4, the on-resistance of the transistor M1 has a small value over a broad bandwidth. Accordingly, isolation characteristics of the transmit-receive switching circuit 1 in the case of reception are effective in a broad band.

Further, in the present embodiment, isolation in the case of reception is achieved using the transistor M1 originally provided in the output stage of the transmitter circuit 4. Since there is no need to add a dedicated transistor to be isolated in the case of reception, unnecessary parasitic capacitance can be prevented.

As stated above, in the first embodiment, the power amplifier transistor M1 in the output stage of the transmitter circuit 4 is used also as a transistor for achieving isolation in the case of reception, which makes it possible to reduce on-resistance and to eliminate the need for an additional transistor for isolation while preventing the increase in parasitic capacitance. Since there is no need to consider the balance between on-resistance and parasitic capacitance, which is a conventional problem, design can be made easier.

(Second Embodiment)

A second embodiment to be explained below is characterized in that the antenna 3 is connected to differential lines.

Figure 2:
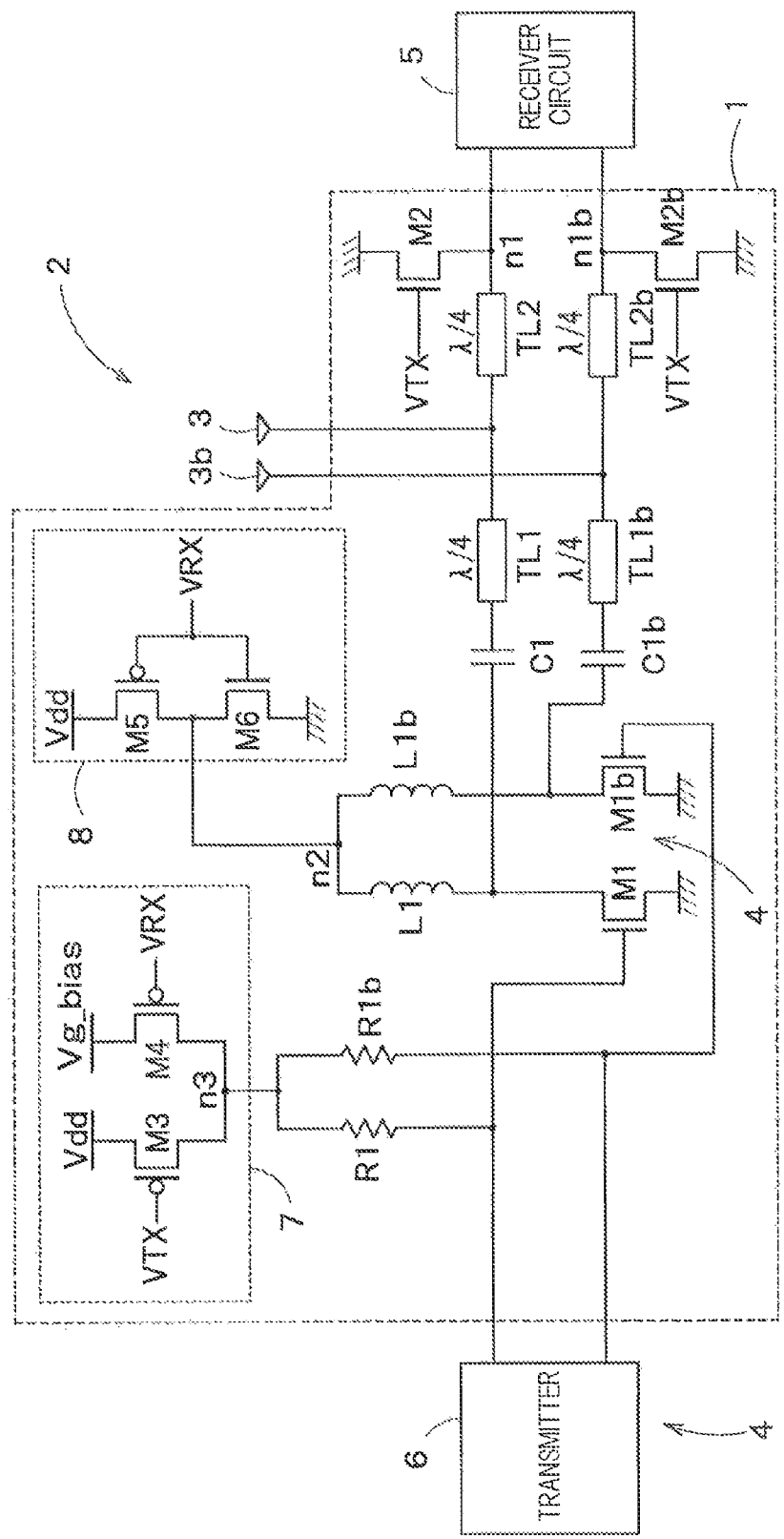
FIG. 2 is a circuit diagram of the wireless device 2 having the transmit-receive switching circuit 1 according to a second embodiment.

FIG. 2 is a circuit diagram of the wireless device 2 having the transmit-receive switching circuit 1 according to the second embodiment. In FIG. 2, the same components as those in FIG. 1 are given the same symbols, and differences therebetween will be mainly explained.

In the wireless device 2 of FIG. 2, a differential configuration is employed except in the transistor input control circuit and the transistor output control circuit 8. The transistor input control circuit 7 and the transistor output control circuit 8 are formed similarly to those of FIG. 1.

The gates of power amplifier transistors M1 and M1b in the output stage of the transmitter circuit 4 are connected to resistances R1 and R1b, respectively. The other ends of the resistances R1 and R1b are connected in common to a common-mode gate node n3. The drains of the transistors M3 and M4 in the transistor input control circuit 7 are connected to the common-mode gate node n3.

Similarly, the drains of the transistors M1 and M1b are connected to inductors L1 and L1b, respectively. The other ends of the inductors L1 and L1b are connected in common to a common-mode drain node n2. The drains of the transistors M5 and M6 in the transistor output control circuit 8 are connected to the common-mode drain node n2.

In this way, the common-mode gate node n3 and the common-mode drain node n2 achieve ideal alternating-current grounding, and the transistor input control circuit 7 and the transistor output control circuit 8 are not influenced by the high-frequency characteristics of the transistors M1 and M1b. That is, even when an output signal from the transistor input control circuit 7 or transistor output control circuit 8 includes a noise, the influence of the noise is eliminated. Therefore, the noise of the output signal inputted into the common-mode gate node n3 or common-mode drain node n2 is balanced and removed when the transistors M1 and M1b perform differential amplification on the output signal.

As stated above, in the second embodiment, the transmit-receive switching circuit 1 has a differential configuration in which the output signal from the transistor input control circuit 7 is supplied to the common-mode gate node n3 and the output signal from the transistor output control circuit 8 is supplied to the common-mode drain node n2, which makes it possible to balance and remove the noise occurring in the transistor input control circuit 7 and the transistor output control circuit 8, while improving the high-frequency characteristics of the transistors M1 and M1b.

(Third Embodiment)

A third embodiment to be explained below is characterized in that the transistor M1 has a cascode configuration.

Figure 3:
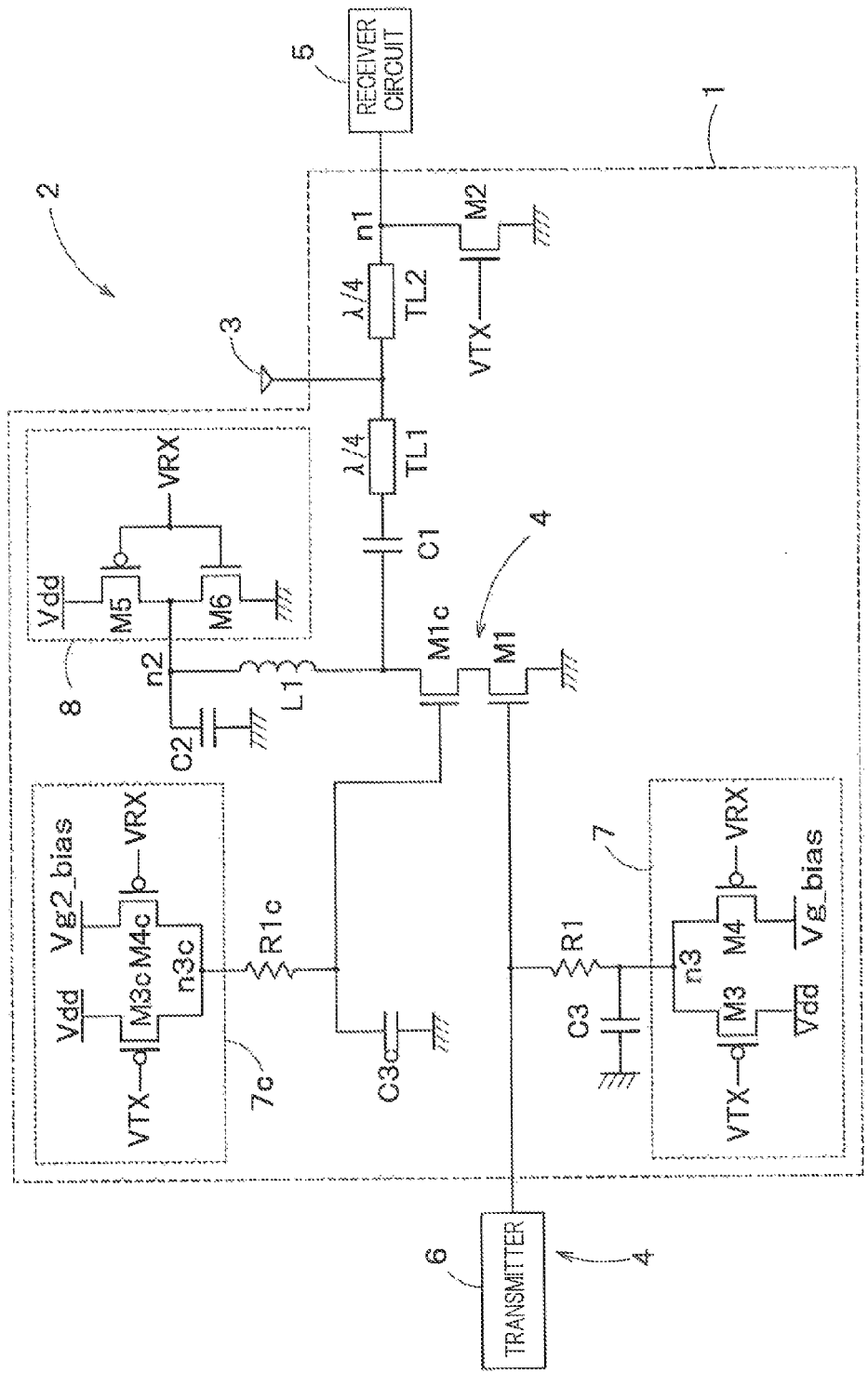
FIG. 3 is a circuit diagram of the wireless device 2 having the transmit-receive switching circuit 1 according to a third embodiment.

FIG. 3 is a circuit diagram of the wireless device 2 having the transmit-receive switching circuit 1 according to the third embodiment. In FIG. 3, the same components as those in FIG. 1 are given the same symbols, and differences therebetween will be mainly explained.

In the wireless device 2 of FIG. 3, the power amplifier transistor (sub-transistor) M1 in the output stage of the transmitter circuit 4 is newly connected to a transistor (sub-transistor) M1c in cascode, and transistor input control circuits 7 and 7c are provided corresponding to the transistors M1 and M1c, respectively. Each of the transistor input control circuits 7 and 7c has an internal structure similar to FIG. 1. The transistor input control circuit 7c corresponding to the transistor M1c has a pair of transistors M3c and M4c whose drains are connected in common. A resistance Ric is connected between the drains of the transistors M3c and M4c and the gate of the transistor M1c. A capacitor C3c is connected between the gate of the transistor M1c and a ground terminal.

The transistors M1 and M1c connected in cascode operate as power amplifiers in the case of transmission, and are turned on in the case of reception to operate as on-resistances. Thus, in the case of reception, the impedance on the side of the transmitter circuit 4 is low when seen from the drain of the transistor M1c, but high when seen from the antenna 3.

When employing the cascode configuration, switching performance is deteriorated due to the increase in on-resistance, but isolation between input and output is improved and oscillation hardly occurs even when calculating a large gain, which leads to the improvement of stability.

As stated above, in the third embodiment, even when the transistors M1 and M1c in the output stage of the transmitter circuit 4 are connected in cascode, isolation performance can be improved by turning on the transistors M1 and M1c in the case of reception.

As stated above, in the first to third embodiments, the transfer lines TL1 and TL2 and the capacitor C1 are connected on the path between the drain of the transistor M1 (M1c) and the input terminal of the receiver circuit 5, but this path configuration can be variously changed.

Further, in the first to third embodiments, the transistor output control circuit 8 is connected to the drain of the transistor M1 (M1c) through the inductor L1, but the internal structure of the transistor output control circuit 8 can also be variously changed.

The whole of the wireless device 2 shown in FIG. 1 etc. may be integrated into one chip, or the transmit-receive switching circuit 1 may be formed in another chip, for example. Further, when the wireless device 2 covers a plurality of wireless methods, the transmit-receive switching circuit 1 should be provided corresponding to each wireless method.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. A transmit-receive switching circuit provided between a transmitter circuit to generate a transmission signal to be transmitted from an antenna and a receiver circuit to receive a reception signal received by the antenna, comprising:
    a transistor input control circuit to make the transmitter circuit generate the transmission signal by an amplifying operation of a transistor in an output stage of the transmitter circuit when the transmission signal is transmitted from the antenna, and to turn on the transistor in order to short-circuit an output terminal of the transistor connected to an output terminal of the transmitter circuit to a ground voltage when the reception signal is received by the antenna, the transistor input control circuit supplying a predetermined bias voltage to a control terminal of the transistor so that the transistor performs the amplifying operation when the transmission signal is transmitted from the antenna, and supplies a predetermined reference voltage to the control terminal of the transistor so that the transistor is turned on when the reception signal is received by the antenna; and
    a transistor output control circuit to control the voltage of an output terminal of the transistor so that current depending on the transmission signal flows through the output terminal of the transmitter circuit when the bias voltage is supplied to the control terminal of the transistor, and so that the output terminal of the transmitter circuit has the ground voltage when the reference voltage is supplied to the control terminal of the transistor.

2. The circuit of claim 1,
wherein the transistor input control circuit operates the transistor as a power amplifier when the transmission signal is transmitted from the antenna, and uses the transistor for a cut-off of the transmitter when the reception signal is received by the antenna.

3. The circuit of claim 1, further comprising:
a transmitting-side transfer line having a line length of ¼λ, where λ represents a wavelength of a transfer signal, and interposed between the transmitter circuit and the antenna.

4. The circuit of claim 1,
wherein the transmitter circuit has a pair of the transistors for generating differential transmission signals, and common-mode terminals are provided to supply an output signal of the transistor input control circuit to the control terminal of each of the paired transistors.

5. The circuit of claim 1,
wherein the transistor comprises a plurality of sub-transistors connected in cascode, and
the transistor input control circuit supplies a predetermined bias voltage to a control terminal of each of the sub-transistors so that each of the sub-transistors performs the amplifying operation when the transmission signal is transmitted from the antenna, and supplies a predetermined reference voltage to the control terminal of each of the sub-transistors so that each of the sub-transistors is turned on when the reception signal is received by the antenna.

6. A wireless device, comprising:
a transmitter circuit to generate a transmission signal to be transmitted from an antenna;
a receiver circuit to receive a reception signal received by the antenna; and
a transmit-receive switching circuit provided between the transmitter circuit and the receiver circuit,
the transmit-receive switching circuit having a transistor input control circuit to make the transmitter generate the transmission signal by an amplifying operation of a transistor in an output stage of the transmitter circuit when the transmission signal is transmitted from the antenna, and to turn on the transistor in order to short-circuit an output terminal of the transistor connected to an output terminal of the transmitter circuit to a ground voltage when the reception signal is received by the antenna, the transistor input control circuit supplying a predetermined bias voltage to a control terminal of the transistor so that the transistor performs the amplifying operation when the transmission signal is transmitted from the antenna, and supplies a predetermined reference voltage to the control terminal of the transistor so that the transistor is turned on when the reception signal is received by the antenna; and
a transistor output control circuit to control the voltage of an output terminal of the transistor so that current depending on the transmission signal flows through the output terminal of the transmitter circuit when the bias voltage is supplied to the control terminal of the transistor, and so that the output is supplied to the control terminal of the transistor and so that the output terminal of the transmitter circuit has the ground voltage when the reference voltage is supplied to the control terminal of the transistor.

7. The device of claim 6,
wherein the transistor input control circuit operates the transistor as a power amplifier when the transmission signal is transmitted from the antenna, and uses the transistor for a cut-off of the transmitter when the reception signal is received by the antenna.

8. The device of claim 6, further comprising:
a transmitting-side transfer line having a line length of ¼λ, where λ represents a wavelength of a transfer signal, and interposed between the transmitter circuit and the antenna.

9. The device of claim 6,
wherein the transmitter circuit has a pair of the transistors for generating differential transmission signals, and
common-mode terminals are provided to supply an output signal of the transistor input control circuit to the control terminal of each of the paired transistors.

10. The device of claim 6,
wherein the transistor comprises a plurality of sub-transistors connected in cascode, and the transistor input control circuit supplies a predetermined bias voltage to a control terminal of each of the sub-transistors so that each of the sub-transistors performs the amplifying operation when the transmission signal is transmitted from the antenna, and supplies a predetermined reference voltage to the control terminal of each of the sub-transistors so that each of the sub-transistors is turned on when the reception signal is received by the antenna.

11. A transmit-receive switching method of switching a transmitter circuit to generate a transmission signal to be transmitted from an antenna and a receiver circuit to receive a reception signal received by the antenna, comprising:
generating a control signal to generate a transmission signal obtained by an amplifying operation of a transistor when the transmission signal is transmitted from the antenna and to turn on the transistor in order to short-circuit an output terminal of the transistor connected to an output terminal of the transmitter circuit to a ground voltage when the reception signal is received by the antenna, transmission is performed through the antenna by supplying a predetermined bias voltage to a control terminal of the transistor so that the transistor performs the amplifying operation, and reception is performed through the antenna by supplying a predetermined reference voltage to the control terminal of the transistor so that the transistor is turned on; and
controlling the voltage of an output terminal of the transistor so that current depending on the transmission signal flows through the output terminal of the transmitter circuit when the bias voltage is supplied to the control terminal of the transistor, and so that the output terminal of the transmitter circuit has the ground voltage when the reference voltage is supplied to the control terminal of the transistor.

12. The method of claim 11, further comprising:
disposing a transmitting-side transfer line to have a line length of ¼λ, where λ represents a wavelength of a transfer signal, and be interposed between the transmitter circuit and the antenna.

13. The method of claim 11,
wherein a pair of the transistors are disposed in the transmitter circuit to generate differential transmission signals, and
the control signal is inputted to each of control terminals of the pair of the transistors.

14. The method of claim 11,
wherein the transistor comprises a plurality of sub-transistors connected in cascode, and
in each of the sub-transistors, transmission is performed through the antenna by supplying a predetermined bias voltage to a control terminal of the sub-transistor so that the sub-transistor performs the amplifying operation, and reception is performed through the antenna by supplying a predetermined reference voltage to the control terminal of the sub-transistor so that the sub-transistor is turned on.

* * * * *